United States Patent [19]
Shirogane et al.

[11] Patent Number: 5,356,181
[45] Date of Patent: Oct. 18, 1994

[54] JOINTING DEVICE FOR A CORRUGATED FLEXIBLE CONDUIT

[75] Inventors: Katsuhiko Shirogane; Tsuneo Kubo, both of Ichihara; Nobuyuki Nagashima; Kiyoshi Nakayama, both of Chiba, all of Japan

[73] Assignee: The Furukawa Electric Co., Ltd., Tokyo, Japan

[21] Appl. No.: 135,292

[22] Filed: Oct. 12, 1993

[30] Foreign Application Priority Data

Oct. 15, 1992 [JP] Japan ................................. 4-277004
Mar. 26, 1993 [JP] Japan ................................. 5-067933

[51] Int. Cl.⁵ ............................................. F16L 55/00
[52] U.S. Cl. ........................................ 285/86; 285/93; 285/308; 285/319; 285/903; 285/921
[58] Field of Search ............... 285/315, 316, 903, 319, 285/86, 93, 308, 921

[56] References Cited

U.S. PATENT DOCUMENTS

| | | | |
|---|---|---|---|
| 2,092,116 | 9/1937 | Hansen | 285/315 X |
| 5,005,877 | 4/1991 | Hayman | 285/315 |
| 5,112,086 | 5/1992 | Gruber et al. | |

FOREIGN PATENT DOCUMENTS

2060106 4/1981 United Kingdom ................. 285/315

*Primary Examiner*—Dave W. Arola
*Attorney, Agent, or Firm*—Frishauf, Holtz, Goodman & Woodward

[57] ABSTRACT

A jointing device, which permits quick connection and disconnection of a corrugated flexible conduit, comprises a joint body having a cylindrical connector section for receiving the conduit, the connector section being formed with receive holes arranged circumferentially thereof, and a clasp axially slidably mounted on the joint body. The clasp has an outer cylinder axially slidably fitted on the connector section and covering the receive holes formed in the connector section, an inner cylinder slidably fitted into the connector section for receiving the conduit, and locking members connected at their respective fixed ends with the inner cylinder. The outer and inner cylinders are connected with each other. The locking members each have a free end portion thereof formed with a claw engageable with and disengageable from the conduit. The free end portion of each locking member is received in a corresponding receive hole when the free end portion is pushed radially outward by the corrugated flexible conduit. Each locking member is engaged at its claw with a groove or depression of the corrugated flexible conduit when the free end portion thereof is pushed radially inward by a corresponding receive hole-defining face of the connector section.

11 Claims, 14 Drawing Sheets

F I G. 1
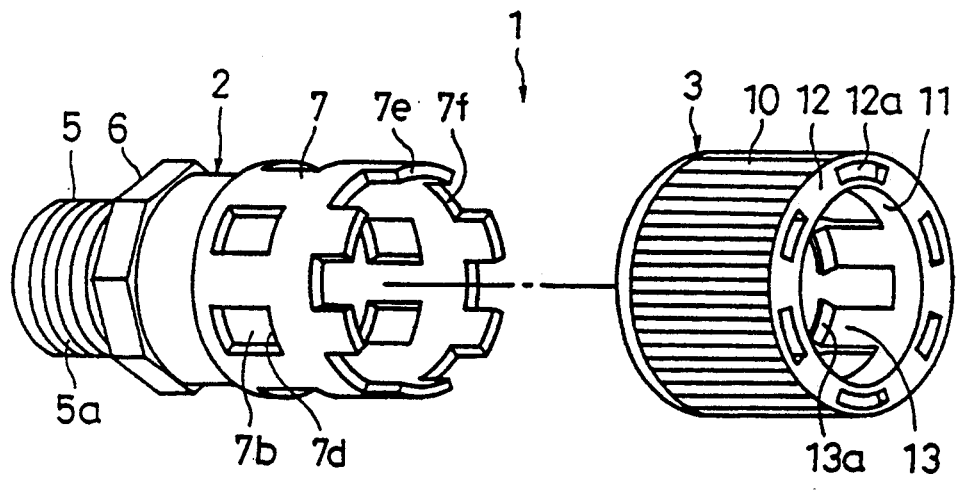
F I G. 2
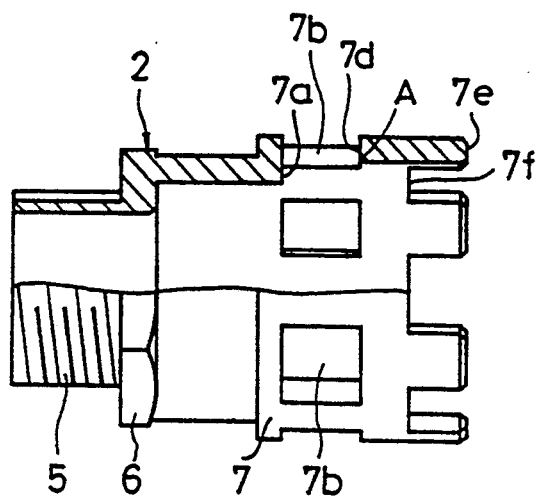
F I G. 3
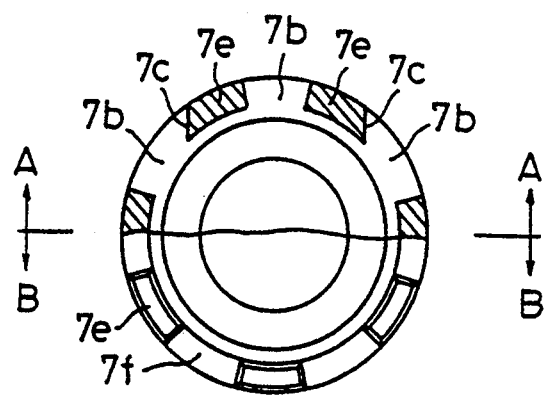

FIG. 7
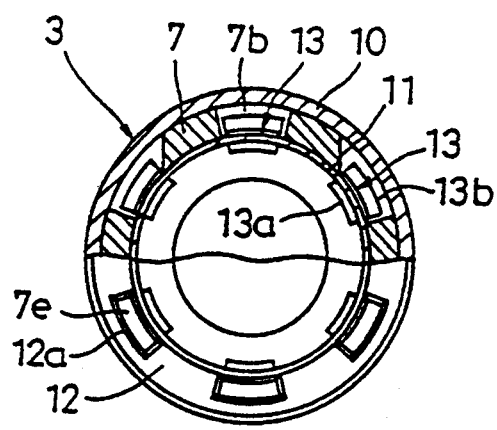
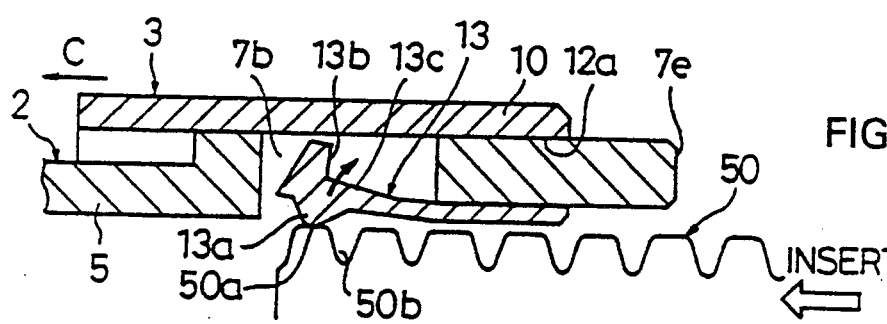
FIG. 8(a)
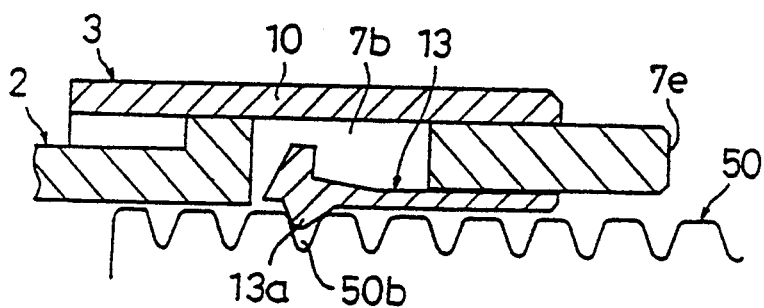
FIG. 8(b)
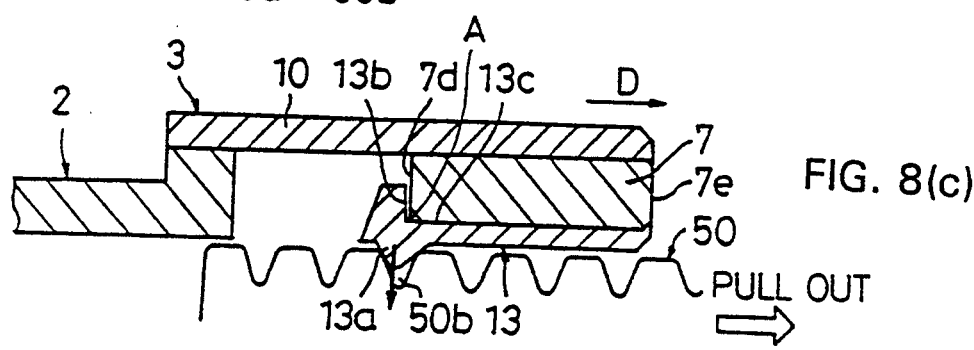
FIG. 8(c)

F I G. 16
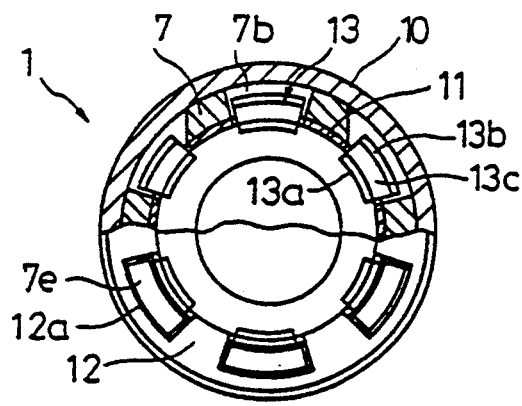
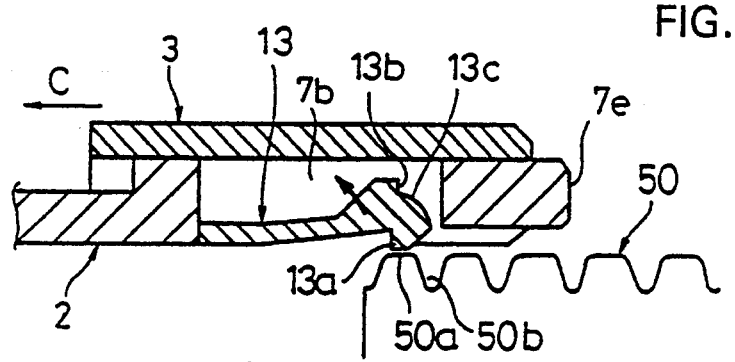
FIG. 17(a)
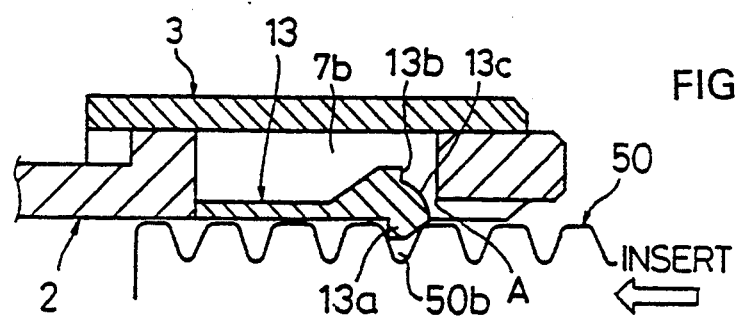
FIG. 17(b)
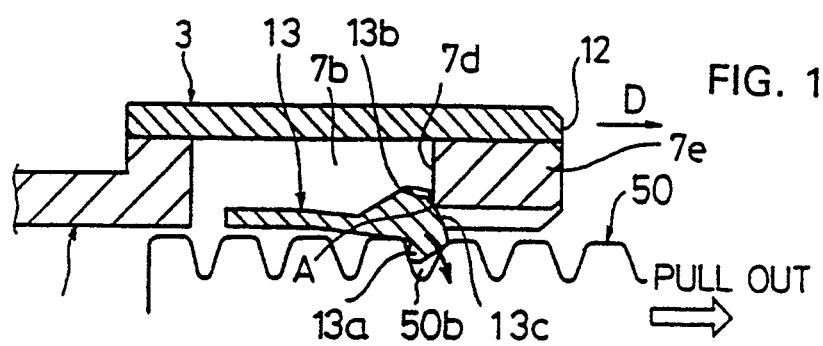
FIG. 17(c)

JOINTING DEVICE FOR A CORRUGATED FLEXIBLE CONDUIT

BACKGROUND OF THE INVENTION

1. Field of the Invention

The present invention relates to a jointing device for a corrugated flexible conduit.

2. Description of the Related Art

Corrugated flexible conduits are used in large quantities as protective conduits for electrical equipment in buildings etc., and there is a demand for a jointing device for connecting a corrugated flexible conduit that is simple in construction and easy to handle. Corrugated flexible conduits are generally classified into a helical ridge type having a helical corrugation ridge (or groove) and a transverse ridge type having transverse corrugation ridges (or grooves) extending parallel with each other. The latter type, i.e., the transverse ridge type, is more flexible and easier to use than the former type, and thus is used in a larger quantity.

Many of conventional jointing devices for a corrugated flexible conduit are so constructed that an end portion of the corrugated flexible conduit is fitted on a connector section of the jointing device and is clamped by means of screws or the like in order to prevent the conduit from being separated from the jointing device. Recently, however, an increasing number of quick-connect type jointing devices has come to be used in which a corrugated flexible conduit can be engaged with and locked in the jointing device by simply inserting an end portion of the conduit into a connector section of the jointing device.

This quick-connect type jointing device is still associated with tile following problems:

(1) Since the connector mechanism is formed by an undercut part of a molding for structural reasons of a mold used, the number of locking claws is limited to two, making it difficult to obtain a sufficient strength against withdrawal (tensile strength) and a conduit retaining force;

(2) It is not easy to insert a corrugated flexible conduit into the jointing device;

(3) In cases where a corrugated flexible conduit is erroneously connected or during maintenance work, the flexible conduit cannot be easily detached from the connector section (while the helical ridge type corrugated conduit can be detached from the jointing device by rotating the connector section like a nut, the transverse ridge type corrugated conduit cannot be detached from the connector section and the connected part of the conduit must be cut off, which may make the conduit useless because of shortened length);

(4) Although the jointing device permits the corrugated flexible conduit to be detached therefrom, the connector section thereof must be disassembled when connecting a flexible conduit thereto, thus requiring labor; and (5) The mold for making the jointing device is complicated in structure and thus is costly.

SUMMARY OF THE INVENTION

An object of the present invention is to provide a jointing device for a corrugated flexible conduit, which device permits a quick and reliable connection of a corrugated flexible conduit thereto and also permits a quick and easy detachment of the conduit therefrom.

According to the present invention, a jointing device for a corrugated flexible conduit is provided, which comprises a joint body having a cylindrical connector section for receiving a corrugated flexible conduit, the connector section being formed with a plurality of receive holes arranged circumferentially thereof, and a clasp axially slidably mounted on the joint body. The clasp has an outer cylinder axially slidably fitted on the connector section and covering the plurality of receive holes formed in the connector section, an inner cylinder slidably fitted into the connector section for receiving the corrugated flexible conduit, and a plurality of locking members connected at their respective fixed ends with the inner cylinder. The outer cylinder and the inner cylinder are connected with each other. The locking members each have a free end portion thereof formed with a claw which is engageable with and disengageable from the corrugated flexible conduit. The free end portion of each locking member is adapted to be received in a corresponding one of the plurality of receive holes formed in the connector section when the free end portion is pushed radially outward by the corrugated flexible conduit. Each locking member is engaged at its claw with the corrugated flexible conduit when the free end portion thereof is pushed radially inward by a corresponding one of receive hole-defining faces of the connector section.

Preferably, the clasp has a stopper which is brought in contact with the connector section as the clasp is axially moved, to thereby prohibit further axial movement of the clasp.

Preferably, the clasp has an end wall to which respective one ends of the outer and inner cylinder are connected. The end wall is formed with openings extending therethrough. The connector section has projections formed integrally therewith so as to be circumferentially aligned with the plurality of receive holes. These projections are slidably fitted into the openings formed in the end wall.

Preferably, the inner cylinder of the clasp is disposed at a location close to the end wall in the axial direction of the jointing device, and each locking member axially extends from the inner cylinder to a side remote from the end wall. Alternatively, the inner cylinder is disposed at a location remote from the end wall, and each locking member axially extends from the inner cylinder to the end wall.

Preferably, the clasp has a plurality of stoppers which are respectively formed in the free end portions of corresponding locking members, or which are respectively formed on inner peripheral surface of the outer cylinder. More preferably, each stopper is formed in a corresponding one of the locking members at a location adjacent to a sloping surface of the corresponding one locking member, the sloping surface being disposed for contact with an associated one of the receive hole-defining faces of the connector section. Each stopper has an end face thereof facing a corresponding one of the receive hole-defining faces. The end face is formed into a tapered surface, and cooperates with an associated one of the sloping surfaces to define a V-groove, as viewed in an axial cross section of the jointing device. Each of the receive hole-defining faces respectively corresponding to the end faces of the stoppers is formed into a tapered surface complementary to the associated end face.

Preferably, at least one of the connector section and the clasp is provided with means for applying a resistance to movement of the clasp in a direction of releasing engagement between the jointing device and the corrugated flexible conduit.

Preferably, each claw is formed at a radially inner side of the free end portion of the associated locking member. The connector section and the associated locking members are designed such that a boundary between a claw-formed portion of the free end portion of each locking member and a portion of the free end portion adjacent to the claw-formed portion is always located more radially inward than a radially inner edge of the receive-hole defining face disposed for contact with the locking member.

Preferably, each locking member is provided with a sloping surface disposed for contact with an associated one of the receive hole-defining faces of the connector section. A sloping surface-formed portion of each locking member has an axial cross sectional shape which is formed such that when the sloping surface contacts the associated receive hole-defining face, an angle formed between a line tangent to the sloping surface at the point of contact and the axis of the jointing device is not greater than 45 degrees regardless of where on the sloping surface the locking member contacts the receive hole-defining face.

The present invention is advantageous in that the jointing device permits quick and easy connection and disconnection of a corrugated flexible conduit. Since, in particular, the corrugated flexible conduit can be easily detached from the jointing device, without the need to destroy the jointing device or to cut the joint between the conduit and the jointing device, the efficiency of maintenance work is improved. Further, the jointing device has a high strength against pulling force because the corrugated flexible conduit is retained by a plurality of locking claws. Since the receive holes of the joint body are closed by the outer cylinder of the clasp, entry of concrete mud (watery part of concrete) or the like into the interior of the jointing device through the receive holes can be prevented.

According to a preferred embodiment of the present invention wherein the clasp has the end wall formed with openings into which the projections of the connector section are fitted, since the openings in the end wall are closed by the respective projections, entry of concrete mud into the inside of the jointing device through the openings can be prevented, even if the openings are formed for efficient production of the clasp by injection molding.

Another preferred embodiment wherein the locking members are provided so as to extend from the inner cylinder disposed at a location close to the end wall to the side remote from the end wall is advantageous in that the gap between the jointing device and the corrugated conduit at the conduit inlet side of the jointing device can be reduced, thereby minimizing the chance of concrete mud entering the jointing device.

According to a still another preferred embodiment wherein locking members are provided so as to extend to the end wall from the inner cylinder disposed at a location remote from the end wall, it is possible to locate the free ends of the locking members on the conduit inlet side of the jointing device, so that the distance between the free ends of the locking members and the associated receive hole-defining faces of the connector section respectively disposed for contact with the free ends can be reduced. Thus, the clasp need be moved only by a short distance between a position where the conduit is detachable and a position where detachment of the conduit is prohibited, and accordingly, the overall length of the jointing device can be shortened.

A further preferred embodiment wherein the stoppers are formed in the associated locking members is advantageous in that the stoppers and the locking claws cooperate to firmly clamp the corrugated flexible conduit.

A preferred embodiment wherein the stoppers are formed on the outer cylinder is advantageous in that it is possible to reliably prevent the clasp from being disengaged from the joint body.

According to another preferred embodiment wherein a V-groove is defined by each stopper and the associated sloping surface, and the corresponding receive hole-defining face of the connector section is formed into a tapered surface complementary to the stopper, all of the locking members are radially inwardly displaced to substantially the same extent when the clasp is moved in the direction of locking the corrugated flexible conduit, whereby loads on the individual locking members can be made uniform.

According to a still another embodiment of the present invention provided with the resistance applying means, it is possible to prevent the clasp from freely moving in the direction of releasing engagement between the jointing device and the corrugated flexible conduit, whereby accidental detachment of the corrugated flexible conduit from the jointing device can be prevented.

Another preferred embodiment wherein the boundary between the claw-formed portion of the free end portion of each associated locking member is designed so as to be located more radially inward than the radially inner edge of the associated receive hole-defining face of the connector section is advantageous in that detachment of the corrugated flexible conduit can be prevented no matter how the conduit is engaged in the jointing device.

A still another embodiment wherein the sloping surface-formed portion of each associated locking member has an axial sectional shape such that an angle formed between the axis of the jointing device and a line tangent to the sloping surface of the locking member at a point at which the sloping surface contacts the corresponding receive hole-defining face is not greater than 45 degrees is advantageous in that the pulling force acting on the corrugated flexible conduit can be efficiently converted into a conduit clamping force.

BRIEF DESCRIPTION OF THE DRAWINGS

FIG. 1 is an exploded perspective view showing a jointing device for a corrugated flexible conduit, according to a first embodiment of the present invention;

FIG. 2 is a side view, partly in cross section, of a joint body shown in FIG. 1;

FIG. 3 is an end view, partly in cross section, of the joint body;

FIG. 7 is an end view, partly in cross section, of the jointing device;

FIGS. 8(a) to 8(c) are enlarged fragmentary sectional views illustrating how a corrugated flexible conduit is inserted into and locked in the jointing device;

FIG. 16 is an end view, partly in cross section, of the jointing device shown;

FIGS. 17(a) to 17(c) are enlarged fragmentary sectional views illustrating how a corrugated flexible conduit is inserted into and locked in the jointing device shown in FIG. 10;

DESCRIPTION OF THE PREFERRED EMBODIMENTS

Figure 4:
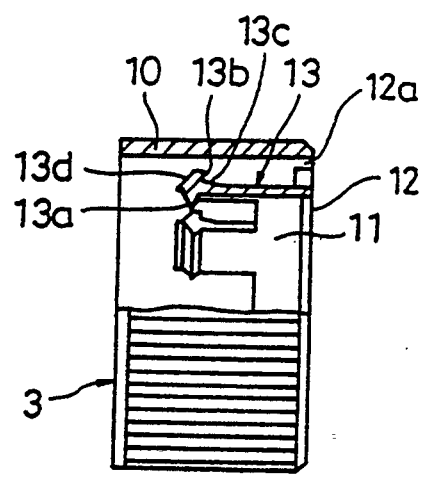
FIG. 4 is a side view, partly in cross section, of a clasp shown in FIG. 1.

Embodiments of a jointing device for a corrugated flexible conduit (hereinafter merely referred to as "jointing device") according to the present invention will be described in detail with reference to the accompanying drawings.

Referring to FIG. 1, a jointing device 1 according to a first embodiment of the present invention is used, for instance, for detachably connecting a corrugated flexible conduit (shown by reference numeral 50 in FIG. 8) with electric equipment, e.g., a distributor box (not shown), the corrugated flexible conduit serving to protect distribution cables (not shown) which are connected to the distributor box. The jointing device 1 comprises a cylindrical joint body 2 fixed to the distributor box, and a cylindrical clasp 3 axially slidably mounted to the joint body 2. The jointing device 1 is designed to permit the corrugated flexible conduit 50 to be quickly connected to and disconnected from the jointing device 1, by slidably moving the clasp 3 with respect to the joint body 2, as described later.

As shown in FIGS 1 to 3, the joint body 2 has a base 5 formed at the outer peripheral surface thereof with a thread 5a, and an octagonal section 6 adapted to be clamped by a tool such as a wrench (not shown), so that the joint body 2 is threadedly fixed to the distributor box by using the wrench. The joint body 2 further includes a connector section 7 for detachably fixing the corrugated flexible conduit 50 to the jointing device 1 in conjunction with the clasp 3. The connector section 7, the base 5, and the octagonal section 6 are formed into one piece.

The connector section 7, which is formed into a hollowed cylindrical shape, has an inner peripheral surface thereof formed at its axially central part with a shoulder 7a. The inner diameter of the connector section 7 on the side close to the base 5 with respect to the shoulder 7a is set to a value slightly larger than the outer diameter of the corrugation ridge of the corrugated flexible conduit 50. The inner diameter of the connector section 7 on the side away from the base 5 with respect to the shoulder 7a is larger than the inner diameter of the connector section 7 on the base 5 side, so that the corrugated flexible conduit 50 is permitted to be inserted into and pulled from the connector section 7. Further, the base side of the connector section 7 has an outer diameter slightly smaller than that of the distal end side, so as to reduce the sliding resistance produced when the clasp 3 is slidably moved relative to the connector section 7.

The connector section 7 is formed at its distal end side with respect to the shoulder 7a with a plurality of, e.g., six, rectangular holes 7b equidistantly in the circumferential direction. Further, the connector section 7 has a distal end formed with, e.g., six projections 7e axially extending therefrom and being circumferentially aligned with the rectangular holes 7b. Adjacent projections 7e define a rectangular recess 7f.

Preferably, the joint body 2 is formed into one piece by injection molding. In this case, a synthetic resin which is excellent in rigidity, chemical resistance, gas-permeation resistance, insulation property, etc., such as fire-retardant polypropylene or rigid PVC (polyvinyl chloride) is used as injection material. In order to make a mold (not shown) for making the joint body 2 by injection molding separable into two mold halves in the directions A—A and B—B as viewed in FIG. 3, two (shown by reference numeral 7c in FIG. 3) of the rectangular hole-defining faces of the connector section 7, which respectively corresponding to respective one longitudinal edges of associated two rectangular holes 7b, extend in the direction (the vertical direction in FIG. 3) perpendicular to the plane at which the two mold halves are separable from each other. Reference numeral 7d (FIG. 1) represents one rectangular hole-defining face which corresponds to a front-side (on the side away from the base) circumferential edge of each rectangular hole 7b.

Figure 5:
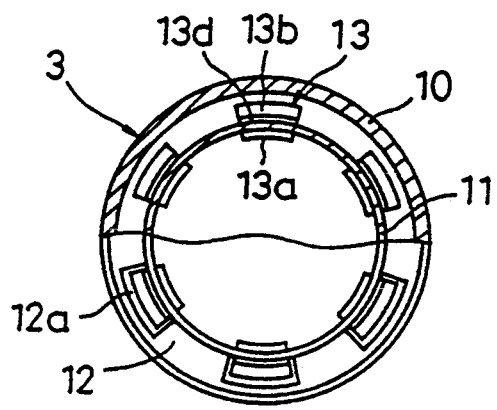
FIG. 5 is an end view, partly in cross section, of the clasp.

As shown in FIGS. 1, 4 and 5, the clasp 3 has an outer cylinder 10 which is axially slidably fitted on the connector section 7 of the joint body 2, an inner cylinder 11 which is shorter in length than the outer cylinder 10 and is slidably fitted into the connector section 7, and an annular end wall 12. The outer and inner cylinders 10 and 11 are connected at their respective front ends (the ends on the side away from the base 5) to the annular end wall 12 integrally therewith. The annular end wall 12 is formed with six holes 12a extending therethrough, so that the respective projections 7e on the front end of the connector section 7 of the joint body 2 are inserted into and detached from the holes 12a.

The inner cylinder 11 has a thickness equal to the difference in inner diameter between the front part and rear part of the connector section 7 (i.e., the height of the shoulder 7a), and has an inner diameter equal to the inner diameter of the rear part of the connector section 7 which is set to a value slightly larger than the outer diameter of the corrugation ridge of the corrugated flexible conduit 50, so that the corrugated flexible conduit 50 can be fitted into and pulled out from the inner cylinder 11 with a small gap therebetween. Axial non-skid grooves are cut in the outer peripheral surface of the outer cylinder 10 along the entire circumference thereof.

The inner cylinder 11 is formed with six locking members 13 integrally therewith, which are respectively associated with the six rectangular holes 7b of the joint body 2. The six locking members 13 are disposed at intervals in the circumferential direction of the jointing device, and project from the rear end of the inner cylinder 11 toward the base 5 in the axial direction of the jointing device.

Each of the locking members 13 has a distal end portion (free end portion) formed at inner and outer peripheral surfaces with a claw 13a and a stopper or detent 13b. The claw 13a projects more radially inwardly than the inner peripheral surface of the inner cylinder 11, and is disposed for engagement with a corrugation groove of the corrugated flexible conduit. The stopper 13b projects more radially outwardly than the outer peripheral surface of the inner cylinder 11 to a radial position intermediate between the inner and outer cylinders 11 and 10. The base 13c of the stopper 13b is formed such that the thickness thereof gradually decreases, as viewed in the longitudinal cross section. In other words, the stopper 13b is formed with a sloping surface for engagement (hereinafter merely referred to as "sloping surface 13c").

Preferably, the clasp 3 is formed into one piece by injection molding. In this case, nylon, fire-retardant polypropylene or the like is employed as injection material.

If a mold for making the clasp 3 by injection molding is designed to be opened in the direction corresponding to the axial direction of the jointing device 1, the claw 13a, stopper 13b and sloping surface 13c of each locking member 13 are formed by an undercut part of the molding, for structural reasons of the mold. Since the end wall 12 has the holes 12a cut therein, the above elements (13a, 13b, 13c) can be formed without undercutting, and thus the structure of the mold can be simplified.

Figure 6:
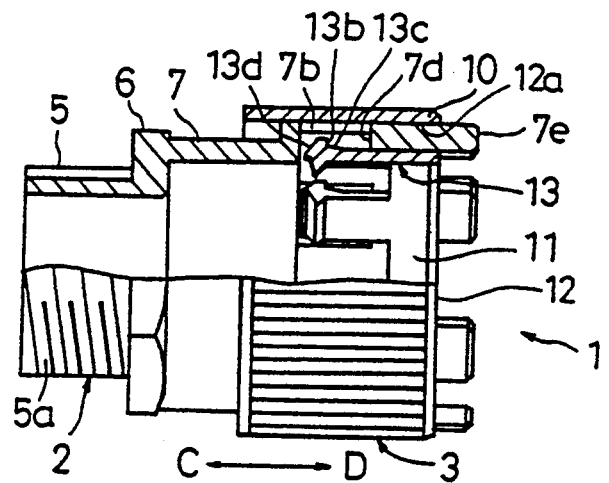
FIG. 6 is a side view, partly in cross section, of the jointing device, illustrating an assembled state.

The clasp 3 is fitted on the front side (projections 7e) of the joint body 2, as shown in FIG. 6. At this time, each locking member 13 is pushed radially inward at a sloping surface 13d formed at a distal end thereof, by the edge of the connector section 7, thus permitting the inner cylinder 11 to be smoothly fitted into the connector section 7. The free end portion sides of the locking members 13 of the clasp 3 are received in the corresponding rectangular holes 7b of the joint body 2, while the projections 7e of the joint body 2 are axially slidably fitted through the corresponding through holes 12a cut in the front end wall 12 of the clasp 3. Namely, the clasp 3 is slidably mounted to the joint body 2 in the axial direction (directions of arrows C and D).

More specifically, the clasp 3 is allowed to move in the direction C up to a position where corresponding recess-defining faces, respectively associated with circumferential edges of the recesses 7, of the connector section 7 are brought in contact with the inner end surface of the end wall 12, and to move in the direction D up to a position where the stoppers 13b of the locking members 13 abut against the associated rectangular hole-defining surfaces 7d of the connector section 7 which surfaces correspond to the front edges of the rectangular holes 7b.

Between the outer and inner cylinders 10 and 11 of the clasp 3 is defined an annular space which permits the free end sides of the locking members 13 of the inner cylinder 11 to be displaced (bent) toward the outer cylinder 11 when a corrugated flexible conduit 50 is inserted into or pulled out from the jointing device.

The following is a description of how a corrugated flexible conduit 50 is connected to and disconnected from the jointing device 1.

First, the jointing device 1 is attached at its base 5 to, e.g., a distributor box (not shown), by aligning the base 5 of the joint body 2 with a mounting hole (not shown) of the distributor box, and screwing the base 5 into the mounting hole, with the octagonal section 6 clamped with a wrench, for example, whereby the jointing device 1 is firmly fixed to the distributor box.

To connect the corrugated flexible conduit 50 to the jointing device 1, the clasp 3 is first moved toward the base 5 of the joint body 2 (in direction C), as shown in FIG. 8(a). In this state, a large part of each locking member 13 of the clasp 3 is situated in the corresponding hole 7b of the joint body 2. Namely, the free end sides (the claws 13a and the stoppers 13b) of the locking members 3 are located on the base side or rear edge side of the respective holes 7b, while the intermediate portions of the locking members are located on the front edge side of the respective holes 7b. Accordingly, the free end sides of the locking members 13 are radially outwardly displaceable (bendable) by their own elasticity. The inner end face of the end wall 12 of the clasp 3 is abutted against the front edge-side recess-defining faces of the connector section 7 (or the bottoms of the recesses 7f). In this state, the projections 7e of the connector section 7 project from the end wall 12 of the clasp 3 in the axial direction, which indicates that the jointing device 1 is in a state permitting the insertion of a corrugated flexible conduit 50.

The operator then inserts the corrugated flexible conduit 50 into the jointing device 1 from the clasp 3. As the corrugated flexible conduit 50 is inserted, the claw 13a of each locking member 13 is pushed radially outward by the corrugation ridge 50a of the flexible conduit 50, as shown in FIG. 8(a), then falls in the corrugation groove (furrow) or depression 50b, whereby an engaged state is established. Since the claw 13a is round-shaped as illustrated, it is again pushed radially outward, along the sloping surface extending between the corrugation groove 50b and the corrugation ridge 50a, to the corrugation ridge 50a as the conduit 50 is further inserted. The corrugated flexible conduit 50 is inserted in this manner, causing the above-mentioned series of motions of the individual locking members 13 (FIG. 8(b)).

After inserting an appropriate length of the flexible conduit 50, the operator slides the clasp 3 in the direction of arrow D, as shown in FIG. 8(c). Hence, the sloping surface 13c of each locking member 13 is pushed radially inward along the inner surface of the connector section 7. Each locking member 13 is held in a radially inwardly urged state, as indicated by the arrow in FIG. 8(c), with the stopper 13b abutted against the associated rectangular hole-defining surface 7d of the connector section 7. As a result, the claw 13a engages deep within the corrugation groove 50b of the flexible conduit 50, thereby locking the corrugated flexible conduit 50. Although FIG. 8 illustrates only one locking member 13, all of the six locking members 13 arranged equidistantly in the circumferential direction engage with the corrugation groove 50b of the flexible conduit 50 in substantially the same manner. Consequently, the corrugated flexible conduit 50 is firmly retained by the jointing device 1, and is not detached therefrom even if pulled in the direction of arrow D.

Since the stopper 13b of each locking member 13 engages with the hole-defining face 7d of the connector section 7, the clasp 3 is never separated from the joint body 2. In this state, the projections 7e of the connector section 7 of the joint body 2 are flush with the end surface 12 of the clasp 3, indicating a state in which the corrugated flexible conduit 50 is locked in the jointing device 1.

Figure 9A:
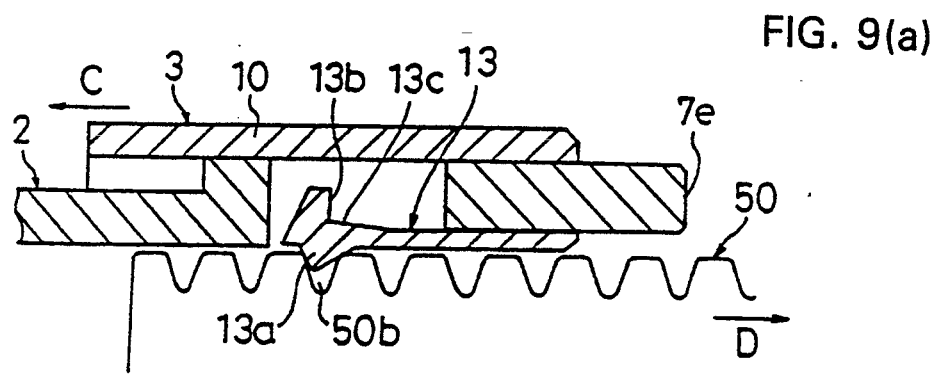
FIGS. 9(a) and 9(b) are enlarged fragmentary sectional views illustrating how the corrugated flexible conduit is drawn out of the jointing device.
Figure 9B:
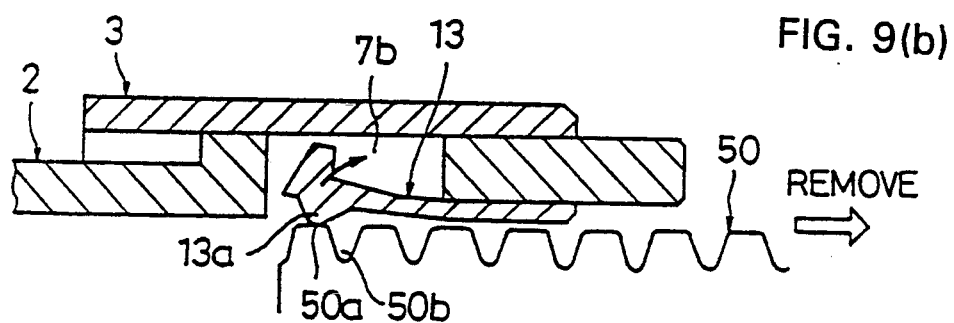

To disconnect the corrugated flexible conduit 50 from the jointing device 1, the above-described steps are taken in the reverse order. More specifically, the clasp 3 is first slid in the direction of arrow C, as shown in FIG. 9(a), whereby the free end side of each locking member 13 moves toward the base-side or rear edge-side of the corresponding hole 7b into a state in which it is radially outwardly displaceable. At this time, the projections 7e of the connector section 7 of the joint body 2 project axially outward from the end surface 12 of the clasp 3, thus indicating a state in which the corrugated flexible conduit 50 can be disconnected from the jointing device 1. In this state, the operator pulls out the corrugated flexible conduit 50 in the direction of arrow D, whereupon the claws 13a are displaced radially outwardly, as indicated by the arrow in FIG. 9(b), as they encounter the corrugation ridge 50a of the flexible conduit 50. The locking members 13 repeat this motion and the corrugated flexible conduit 50 is finally detached from the clasp 3, as shown In FIG. 9(b).

The outer cylinder 10 of the clasp 3 closes (i.e. covers) the holes 7b of the joint body 2 to prevent entry of concrete mud (watery part of concrete) through the holes 7b during construction work, and also serves as a grip when the corrugated flexible conduit 50 is pulled out for disengagement. The projections 7e of the joint body 2 close the holes 12a of the end wall 12 to prevent entry of concrete mud through the holes 12a during construction work, and also functions as a gauge for indicating that the corrugated flexible conduit is locked or unlocked. Namely, when the projections 7e project from the end surface 12, it means that the corrugated flexible conduit is in a detachable state, and when the projections 7e are flush with the end surface 12, it means that the flexible conduit is locked and cannot be detached.

In the jointing device of this embodiment, the inner cylinder 11 is fixed at its front end to the end wall 12, while the locking members 13 are provided at the rear end of the inner cylinder 11, whereby the gap at the conduit inlet opening between the jointing device 1 and the corrugated flexible conduit 50 can be reduced. Thus, the jointing device 1 of the present embodiment is advantageous in that concrete mud or the like scarcely enters the interior thereof.

Next, with reference to FIGS. 10-18, a jointing device for a corrugated flexible conduit according to a second embodiment of the present invention will be explained. In these figures, like reference numerals are used to denote elements similar or corresponding to those of the jointing device 1 of the first embodiment, shown in FIG. 1. In the following, only those elements different from the corresponding elements of the first embodiment will be explained and description of the other elements is omitted.

Figure 10:
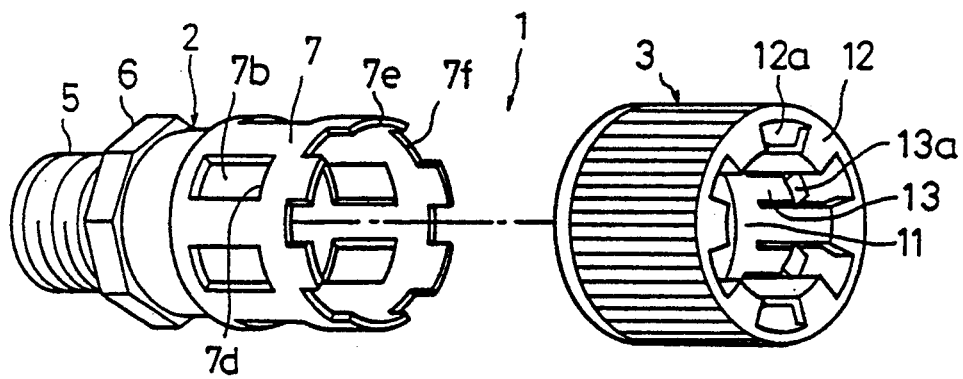
FIG. 10 is an exploded perspective view of a jointing device for a corrugated flexible conduit, according to a second embodiment of the invention.
Figure 11:
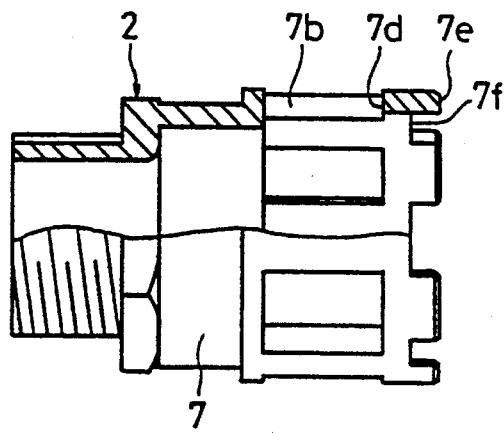
FIG. 11 is a side view, partly in cross section, of a joint body shown in FIG. 10.
Figure 12:
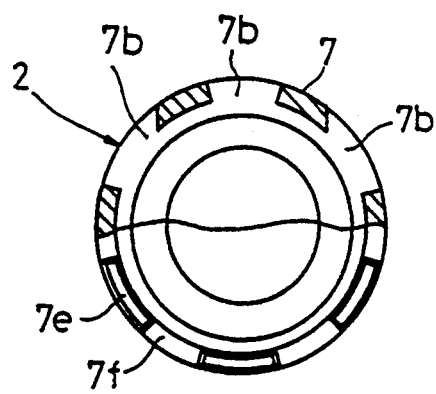
FIG. 12 is an end view, partly in cross section, of the joint body of FIG. 11.
Figure 13:
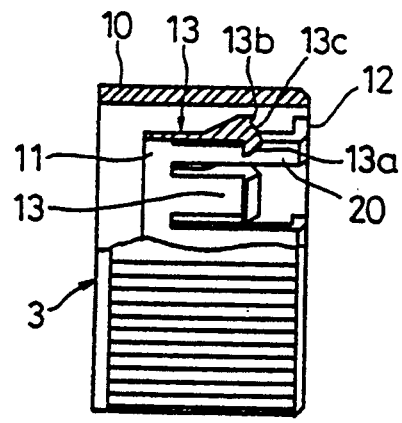
FIG. 13 is a side view, partly in cross section, of the clasp.
Figure 14:
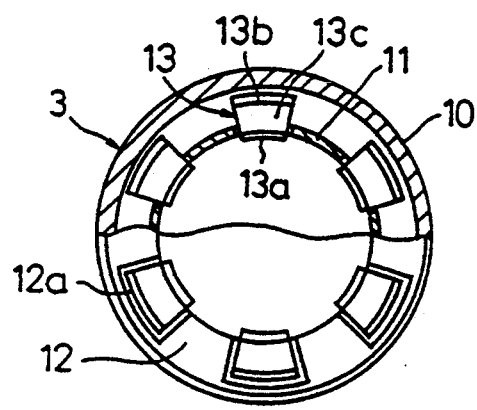
FIG. 14 is an end view, partly in cross section, of the clasp.

In the joint body 2 shown in FIGS. 10 and 11, the holes 7b cut in the connector section 7 have a slightly greater longitudinal or axial length than the corresponding holes of the joint body 2 shown in FIG. 1, and the projections 7e at the front end of the joint body 2 are slightly shorter than the counterpart of FIG. 1. As distinct from the first embodiment where the inner cylinder 11 is provided on the front end side (the conduit inlet side) of the clasp 3, the inner cylinder 11 of the clasp 3 is located axially inward of the clasp 3, as shown in FIGS. 10 and 13, and is connected to the end wall 12 by means of bridges 20. The locking members 13 project in a direction opposite to that in which the locking members 13 of FIG. 1 project. Namely, the free end side, i.e., claw 13a and stopper 13b, of each locking member 13 points to the front side of the clasp 3.

The stopper 13b faces the front of the clasp 3, and the base (sloping surface 13c) of the stopper 13b is curved and continuous with the tip of the locking member 13. A plurality of, e.g., six slits 12a (FIG. 10) are formed in the end wall 12 to which the outer and inner cylinders 10 and 11 are connected at their front ends, so that the projections 7e of the joint body 2 are inserted through the respective slits 12a.

Figure 15:
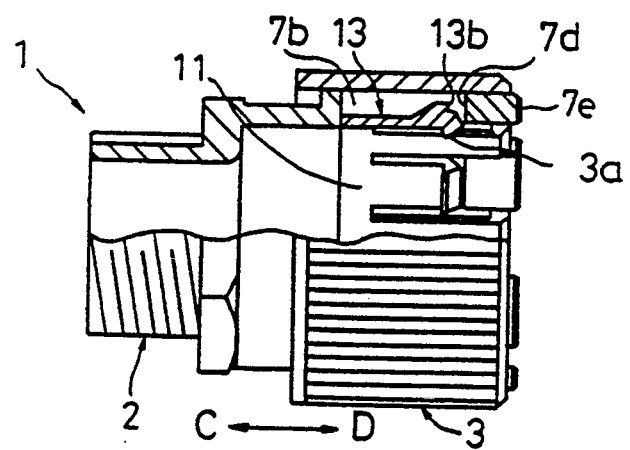
FIG. 15 is a side view, partly in cross section, of the jointing device, illustrating an assembled state.

When the clasp 3 is fitted on the joint body 2 as shown in FIG. 15, it is slidable in directions C and D relative to the joint body 2. On the other hand, as in the case of the first embodiment, the movement of the clasp 3 in direction C is restricted when the recess-defining faces 7f (FIG. 11) of the connector section 7 of the joint body 2 abut against the inner surface of the end wall 12, and the movement of the clasp 3 in direction D is restricted when the stoppers 13b of the locking members 13 abut against the rectangular hole-defining surfaces 7d of the connector section 7.

To insert the corrugated flexible conduit 50 into the jointing device 1, the clasp 3 is first moved in the direction of arrow C, as shown In FIG. 17(a). In this case, the projections 7e of the joint body 2 project from the end surface 12 of the clasp 3, indicating that the jointing device 1 is in a state permitting insertion or pulling out of the corrugated flexible conduit 50. As the corrugated flexible conduit 50 is inserted, the free end portion of each locking member 13 is pushed radially outward by the corrugation ridge 50a of the conduit 50, as indicated by the arrow In FIG. 17(a), then falls in the corrugation groove 50b by its own elasticity, and is again pushed radially outward along the sloping surface of the conduit 50 to the corrugation ridge 50a. The corrugated flexible conduit 50 is inserted by an appropriate length in this manner (FIG. 18(b)), causing the aforesaid motion of the individual locking members 13.

After the flexible conduit 50 is inserted into the jointing device 1, the clasp 3 is moved in the direction of arrow D, as shown in FIG. 17(c). Hence, the sloping surface 13c of each locking member 13 is pushed radially inward by the radially inward edges of the rectangular hole-defining faces 7d of the connector section at which edges the faces 7d intersect with the inner peripheral surface of the connector section 7. When the stoppers 13b are brought into contact with the hole-defining faces 7d of the connector section 7, a state where the claws 13a are caused to be pushed into the corrugation groove 50b, and at the same time these claws 13a are in urged contact with an upper part of the slope surface of the corrugated flexible conduit 50, as indicated by the arrow in FIG. 17(c), is established. Consequently, the corrugated flexible conduit 50 is firmly locked in the jointing device 1. Further, the stoppers 13b abut against the connector section 7, whereby a further movement of the clasp 3 in the direction of arrow D is prohibited. At this time, the projections 7e of the joint body 2 are flush with the end surface 12 of the clasp 3, indicating that the corrugated flexible conduit 50 is in a locked state.

Figure 18A:
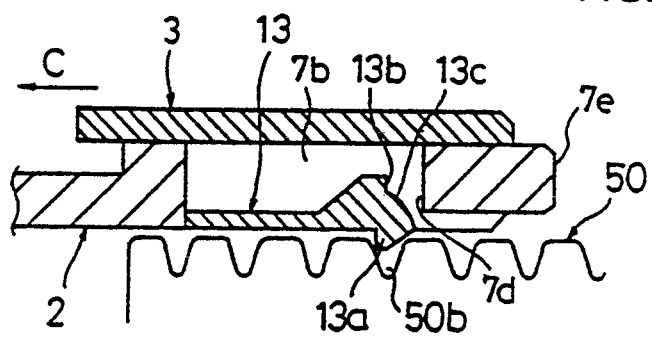
FIGS. 18(a) and 18(b) are enlarged fragmentary sectional views illustrating how the corrugated flexible conduit is drawn out of the jointing device.

To disconnect the corrugated flexible conduit 50 from the jointing device 1, the above-described steps are taken in the reverse order. Specifically, the clasp 3 is first slid in the direction of arrow C, as shown in FIG. 18(a), whereby the stopper 13b of each locking member 13 is disengaged or separated from the rectangular hole-defining face 7d of the connector section 7, thereby releasing the engagement between the clasp 3 and the connector section 7, so as to make the locking member 13 radially outwardly displaceable. Thereafter, the corrugated flexible conduit 50 is pulled out as shown in FIG. 18 (b). In this manner, the flexible conduit 50 can be quickly disconnected from the jointing device 1.

As explained in the above, the corrugated flexible conduit 50 can be quickly and easily inserted into and locked in the jointing device 1, and also can be quickly and easily disengaged and detached from the device 1.

Figure 18B:
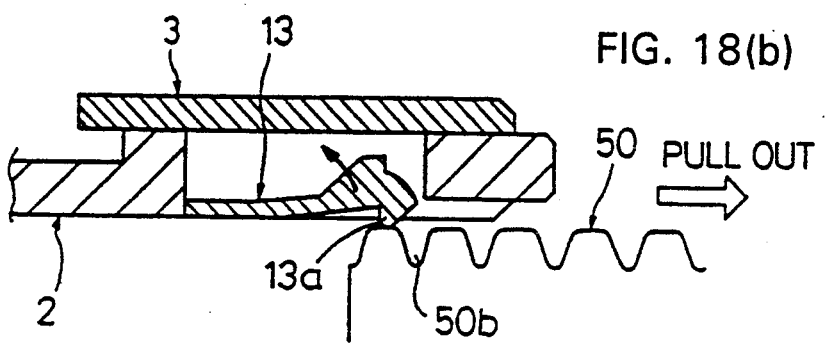

The distance by which the clasp 3 is allowed to move between a position in which the corrugated flexible conduit 50 is locked (FIGS. 8(c), 17(c)) and a position in which the conduit 50 is unlocked (FIGS. 9(b), 18(b)) is determined by the distance between the rectangular hole-defining faces 7d of the joint body 2 and the stoppers 13b of the clasp 3. Accordingly, when comparison is made between the first embodiment shown in FIG. 6 where the stoppers 13b (the free ends of the locking members 13) are located on the rear side close to the base 5 in the axial direction of the jointing device, and the second embodiment shown in FIG. 15 where the stoppers 13b are located on the front side (the end wall 12 side), the movable distance of the clasp 3 in the second embodiment becomes smaller than that in the first embodiment. Thus, the jointing device 1 of the second embodiment is advantageous in that it can be reduced in overall length and thus in size.

Next, with reference to FIGS. 19 and 20, a jointing device according to a third embodiment of the present invention will be explained.

The present embodiment is characterized in that damage to the locking members 13 of the clasp 3 is positively prevented. To this end, as shown in FIG. 19, the end surface 13b' of the stopper 13 of each locking member 13 is formed into a tapered face, as viewed in the longitudinal cross section, which tapered face cooperates with the sloping surface 13c to form a V-groove. Each of the rectangular hole-defining faces 7d of the connector section 7 of the joint body 2 is formed into a tapered face which is complementary to the end face 13b' of the associated stopper 13b.

Figure 20:
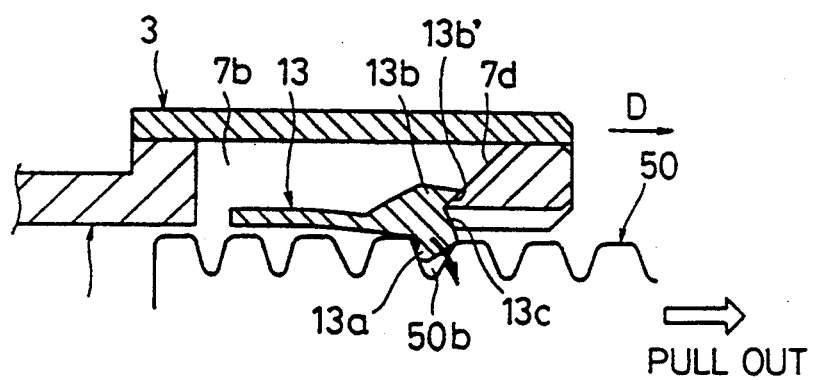
FIG. 20 is an enlarged fragmentary sectional view illustrating how a corrugated flexible conduit is inserted into and locked in the jointing device shown in FIG. 19.

In the jointing device 1 of the present embodiment, after the corrugated flexible conduit 50 is inserted into the jointing device 1 from the inlet opening of the clasp 3, the clasp 3 is shifted in the direction of arrow D in FIG. 20, whereupon the sloping surface 13c of each locking member 13 is pushed radially inwardly by the radially inner edge of the associated rectangular hole-defining face 7d of the connector section 7 at which the face 7d intersects with the inner peripheral surface of the connector section 7, so that claw 13a falls into the corrugation groove 50b of the corrugated flexible conduit 50. When the radially inner edge of each hole-defining face 7d reaches the bottom of the V-groove defined by the end face 13b' of the associated stopper 13b and the associated sloping surface 13c, as shown in FIG. 20, due to a further relative movement between the clasp 3 and the connector section 7, a state such that the claws 13a are pushed into the corrugation groove 50b of the conduit 50 and are in urged contact with the outer face of the conduit 50 is established, whereby the corrugated flexible conduit 50 is firmly locked in the jointing device 1. Also, a further movement of the clasp 3 in direction D is prohibited.

In the present embodiment, since the end face 13b' of each stopper 13b of the clasp 3 is formed into a tapered surface and the associated hole-defining face 7d facing the stopper 13b is also formed into a complementary tapered surface, the locking members 13 each have a self-aligning function. Namely, when the stoppers 13b are urged against the hole-defining faces 7d as shown in FIG. 20, the circumferentially arranged claws 13a, and thus the clasp 13, are always positioned coaxially with the joint body 2, thus making the forces acting on the individual claws 13a uniform. Thus, even though the corrugated flexible conduit 50 is bent or deformed, the claws 13 are disposed coaxially of the joint body 2 when the conduit 50 is locked as shown in FIG. 20, whereby the claws 13a can be prevented from being applied with uneven force, and hence damage thereto or the like is prevented.

In the following, with reference to FIG. 21, a jointing device according to a fourth embodiment of the present invention will be explained.

The jointing device 1 of the present embodiment is characterized in that the claws and stoppers of the clasp 3 are formed as separate elements. Namely, as shown in FIG. 20, the claws 13a are formed on the inner peripheral surface-side of the respective free end portions of a plurality of, e.g., six locking members 13, while a plurality of, preferably, at least three stoppers 13e are formed on the inner peripheral surface of the outer cylinder 10 which is separate from the locking members 13. For instance, the stoppers 13e to be formed may be six in number so as to correspond to the respective claws 13a, or may be three so as to correspond every other one of the six claws 13a as viewed in the circumferential direction of the jointing device 1.

The locking members 13 each have the free end portion thereof formed at its outer periphery-side with the sloping surface 13c. The stoppers 13e are provided at appropriate axial positions in the clasp 3 so as to face the claws 13a, and each have a stepped surface 13e' for abutment with the hole-defining face 7d of the connector section 7. The stepped surface 13e' of each stopper 13e is situated at an axial position corresponding to the most outward (radially outward) point of the sloping surface 13c or at a position slightly closer to the face 7d than the most outward point.

Figure 22:
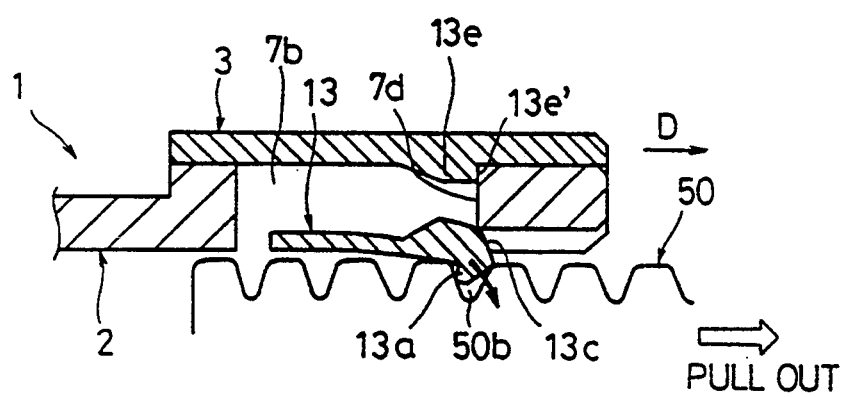
FIG. 22 is an enlarged fragmentary sectional view illustrating how a corrugated flexible conduit is inserted into and locked in the jointing device shown in FIG. 21.

In the jointing device 1 as constructed above, after the corrugated flexible conduit 50 is inserted into the jointing device from the inlet opening of the clasp 3, the clasp 3 is shifted in the direction of arrow D in FIG. 22, whereupon the radially inward edge of the hole-defining face 7d of the connector section 7 pushes the outer part 13c of the claw 13a in the radially inward direction, thereby pushing the claw 13a into the corrugation groove 50b of the conduit 50. When the hole-defining surface 7d is abutted against the stepped surface 13e' of the stopper 13e, further movement of the clasp 3 in direction D is prohibited. Hence, the corrugated flexible conduit 50 is firmly locked in the jointing device 1. The jointing device of this embodiment is advantageous in that the clasp 3 is rarely detached from the joint body 2 because the stoppers 13b are formed on the outer cylinder 10.

In the following, with reference to FIGS. 23-25, jointing devices according to fifth through seventh embodiments of the present invention will be explained.

As mentioned in the above, in the arrangement shown in FIG. 18, if the clasp 3 is shifted in direction C to separate the stopper 13b of each locking member 13 from the associated hole-defining face 7d of the joint body 2, as shown in FIG. 18(a), so that the free end sides of the locking members 13 are allowed to be displaced radially outwardly, then the corrugated flexible conduit 50 can be pulled out as shown in FIG. 18(b). Accordingly, after the corrugated flexible conduit 50 is connected to the jointing device 1, situations may arise where the clasp 3 is pushed against an iron rod or the like and pulled with a large force, with the result that the clasp 3 is displaced in disengagement direction and the conduit 50 detached from the jointing device.

In view of the above circumstances, the fifth through seventh embodiments are characterized in that the clasp 3 is prevented from being easily moved in the axial direction.

Figure 23:
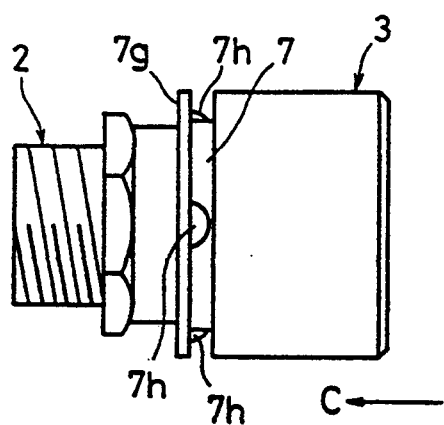
FIG. 23 is a side view showing a jointing device according to a fifth embodiment of the invention.

Namely, in the jointing device shown in FIG. 23, a flange 7g is formed at a rear side of the connector section 7 of the joint body 2, and a plurality of, e.g., four, small swells 7h facing the clasp 3 are formed at the base of the flange 7g at proper intervals in the circumferential direction, so that a suitable resistance is given when the clasp 3 is moved in the disengagement direction (direction C).

When disconnecting the corrugated flexible conduit 50, the operator pushes the clasp 3 against the resisting force to release the engagement between the claws 13 and the connector section 7, and then pulls out the conduit 50.

Figure 24:
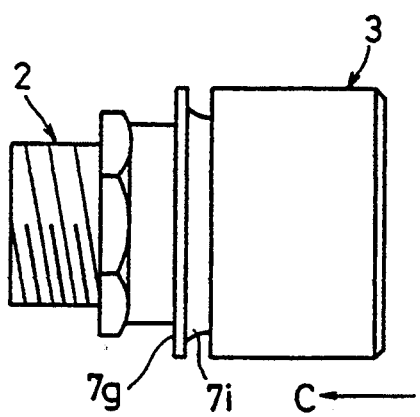
FIG. 24 is a side view showing a jointing device according to a sixth embodiment of the invention.

In the jointing device of the sixth embodiment shown in FIG. 24, the flange 7g is formed in the connector section 7 as in the fifth embodiment, and the outer diameter of the connector section 7 is gradually increased toward the base of the flange 7g in a narrow region on the side close to the clasp 3 with respect to the flange 7g, so that the outer peripheral surface of the connector section 7 is formed into a tapered surface 7i having a function which is similar to that of the small swells 7h shown in FIG. 23.

Figure 25:
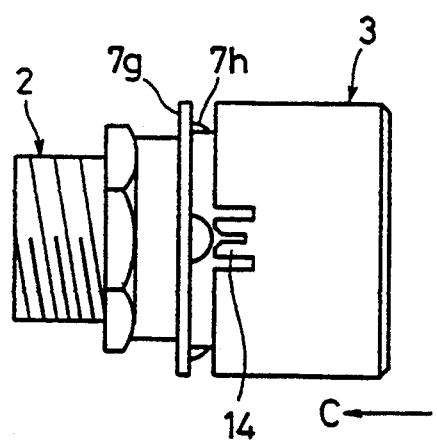
FIG. 25 is a side view showing a jointing device according to a seventh embodiment of the invention.
Figure 26:
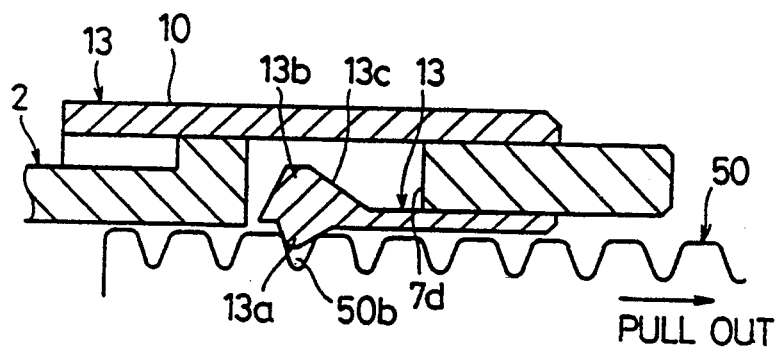
FIG. 26 is an enlarged fragmentary longitudinal sectional view showing a principal part of a jointing device according to an eighth embodiment of the invention.

In the jointing device of the seventh embodiment shown in FIG. 25, small swells which are similar to the swells 7h shown in FIG. 23 are formed on the flange 7g of the connector section 7, and lugs 14 are formed in the associated edge of the clasp 3 so as to face the respective swells 7h. Thus, when the clasp 3 is shifted in the disengagement direction (arrow C), each pair of lugs 14 must be pushed apart by the swell 7h, thus applying a resistance to the clasp 3.

A jointing device according to an eighth embodiment of the present invention is characterized in that the sloping or tapered surface 13c of the stopper 13b of each locking member 13 is made steeper than the counterpart shown In FIG. 8. With this arrangement, when the corrugated flexible conduit 50 is applied with a drawing force, the claws 13a are pushed into the corrugation groove 50b of the conduit 50 more firmly than in the case of FIG. 8(c).

Next, with reference to FIG. 27, a jointing device according to a ninth embodiment of the present invention will be explained.

The present invention contemplates to positively prevent a failure in locking the corrugated flexible conduit 50 to the jointing device 1 by pulling the conduit 50 in the direction opposite to the conduit insertion direction.

The jointing device according to the second embodiment is designed such that, when the corrugated flexible conduit 50 is pulled out after being inserted into the jointing device 1, the sloping surface 13c of each locking member 13 is pushed radially inward by the associated hole-defining face 7 of the connector section 7, so that the conduit 50 is clamped by the claws 13a of the locking members 13 as the conduit 50 is pulled, as shown in FIG. 17(c). According to the jointing device of this kind, normally, it is, of course, possible to clamp the corrugated flexible conduit 50 with the jointing device. However, in case that the outer diameter of the conduit 50 is too large, for instance, the claw 13a of the locking member 13 may interfere with the hole-defining face 7d of the connector section 7 when the free end side of the locking member 13 is displaced radially outwardly by the conduit 50 inserted into the jointing device 1. If the corrugated flexible conduit 50 is pulled under the condition where claw 13a abuts against the hole-defining face 7d, the claw 13a is prevented from entering into the corrugation groove 50b of the conduit 50, so that claws 13a fail to clamp the conduit 50.

Figure 27:
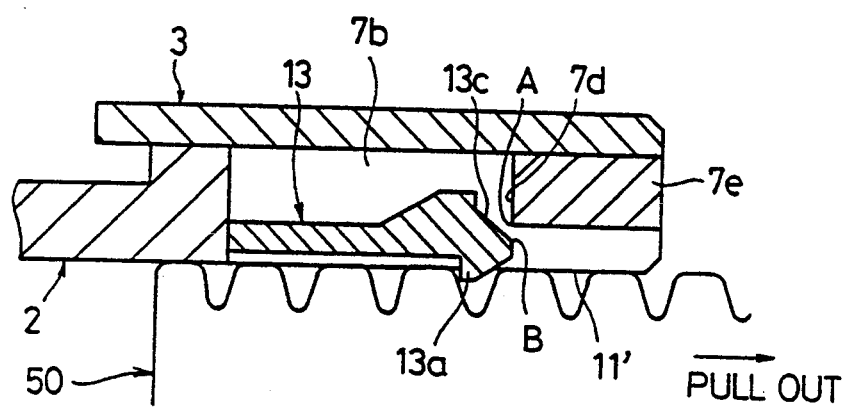
FIG. 27 is an enlarged fragmentary longitudinal sectional view showing a principal part of a jointing device according to a ninth embodiment of the invention.

To avoid such situations, in the jointing device of the present embodiment, shapes and sizes of the relevant parts of the connector section 7 and the clasp are set so that a predetermined positional relationship such that the boundary B between the claw 13a and sloping surface 13c of each locking member 13 is located more radially inward than the radially inner edge A of the associated hole-defining face 7d of the connector section 7 is always established, even when the corrugated flexible conduit 50 is in close contact with the inner peripheral surface 11' of the clasp 3, as shown in FIG. 27, for the reasons such that the corrugated flexible conduit 50 inserted into the jointing device has a large outer diameter which is substantially the same as the inner diameter of the inner cylinder 11 or bridge 20, or the conduit 50 is curved or is urged unevenly to one side within the jointing device.

Consequently, the claws 13a are positively displaced radially inward as the corrugated flexible conduit 50 is pulled, even if the conduit 50 is substantially in contact with the inner peripheral surface 11' of the inner cylinder 11 or bridge 20, since the boundary B between the respective sloping surface 13c and the associated claw 13a is always located more radially inward than the radially inner edge A of the associated hole-defining face 7d of the connector section 7. As a result, the jointing device is enabled to rollably exhibit its function of clamping the corrugated flexible conduit 50 so as to prevent detachment of the conduit 50 from the jointly device.

In the following, with reference to FIGS. 28–30, a jointing device according to a tenth embodiment of the present invention will be explained.

The present embodiment is characterized in that the clamping force applied to the corrugated flexible conduit is increased.

Figure 28:
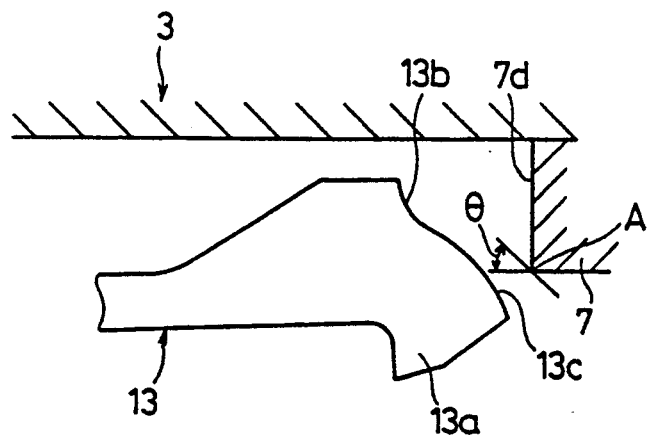
FIG. 28 is an enlarged fragmentary view showing a principal part of a jointing device according to a tenth embodiment of the invention.

To this end, as shown in FIG. 28, the outer surface of the stopper 13b of each locking member 13 and the sloping surface 13 thereof are formed into a sigmoidal continuous curved surface. As a result, when the corrugated flexible conduit is pulled in the direction opposite the conduit inserting direction, the free end portion of each locking member 13 is smoothly displaced radially inwardly along the corner (more specifically, the radially inner edge A of the associated hole-defining face 7d at which edge the face 7d intersects the inner peripheral surface of the connector section 7) of the connector section 7 of the joint body, so that the conduit can be clamped properly compared with the case of FIG. 17(c). Further, the curvature (slope) of the sloping surface 13c is set such that when the surface 13c is in contact with the radially inward edge A of the hole-defining face 7d, an angle θ formed between the axis of the jointing device and a line tangent to the sloping surface 13c at the point of contact between the sloping surface 13c and the edge A is not greater than 45 degrees regardless of where on the sloping surface 13c the locking member 13 contacts the edge A. This arrangement is effective in increasing the clamping force exerted by the claws 13a when the corrugated flexible conduit is pulled.

Figure 29:
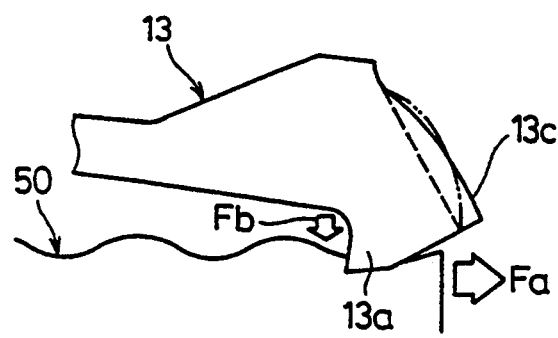
FIG. 29 is a view showing the shape of the sloping surface of the locking member of FIG. 28, together with different sloping surface shapes.
Figure 30:
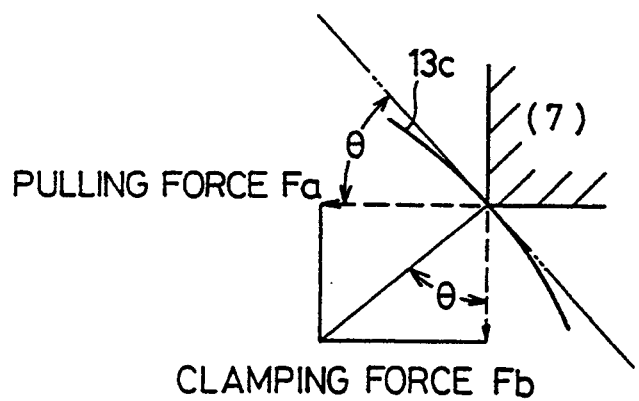
FIG. 30 is a diagram illustrating the relationship between the pulling force acting on the corrugated flexible conduit and the clamping force applied thereon when the sloping surface of the locking member is pushed by the connector section.

The two-dot-chain line and dashed line in FIG. 29 respectively show the sloping surfaces each having a slope which provides the angle θ greater than 45 degrees. FIG. 30 indicates the relationship between the pulling force Fa acting on the corrugated flexible conduit 50 and the clamping force Fb applied to the conduit 50 by the claws 13a.

Figure 31:
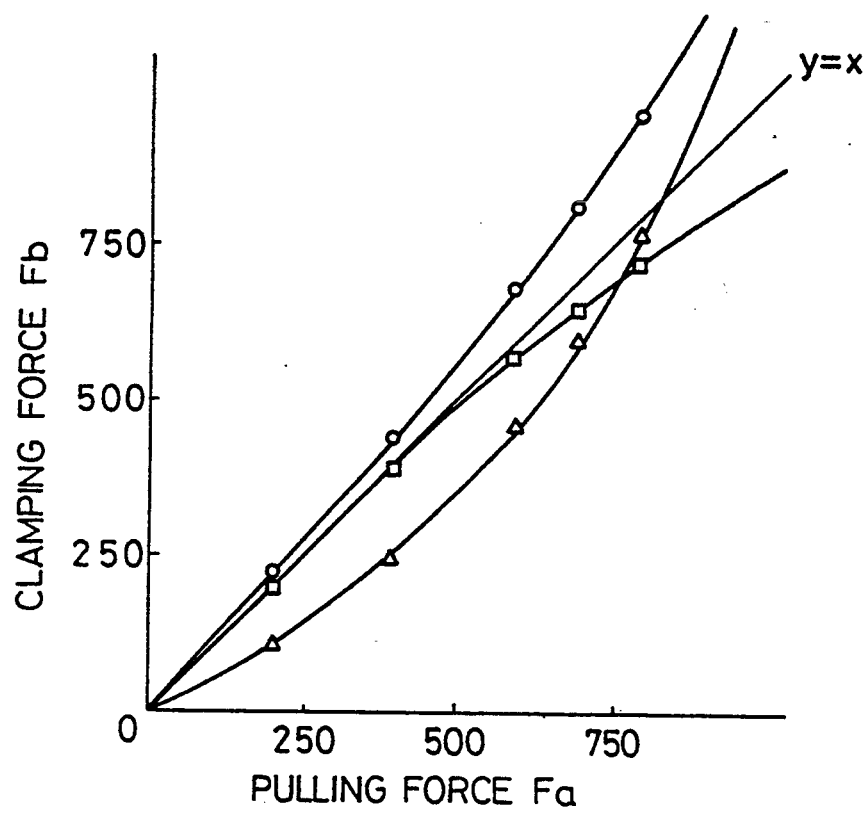
FIG. 31 is a graph illustrating pulling force-clamping force characteristics in connection with the three sloping surface shapes shown in FIG. 29.

In FIG. 31, the circle-connected curve indicates a pulling force vs. clamping force characteristic of the jointing device provided with the sloping surface shown by the solid line in FIG. 29, the triangle-connected curve indicates a similar characteristic of the jointing device provided with the sloping surface indicated by the two-dot-chain line in FIG. 29, and the square-connected curve indicates a similar characteristic of the jointing device provided with the sloping surface indicated by the dashed line in FIG. 29.

As is clear from FIG. 31, where the angle of the sloping surface 13c is greater than 45 degrees, the whole or a major part of the pulling force vs. clamping force characteristic curve falls within a region below the line y = x, i.e., θ = 45°, which means that the clamping force is small. By contrast, in the case where the angle of the sloping surface 13c is smaller than 45 degrees, the curve falls within a region above the line θ = 45°, and thus the clamping force is large.

The present invention is not limited to the aforementioned first through tenth embodiments, and may be modified in various manners.

For instance, in the foregoing embodiments, the joint body 2 is provided at its one side with the base 5 which serves as a mounting section through which the joint body 2 is connected to a distribution box or the like, and is provided at another side with the connector section 7 which cooperates with the clasp 3 to clamp the corrugated flexible conduit. However, the present invention is also applicable to a jointing device which is provided at its opposite ends with the connector sections, and which serves as a relay or junction for connecting two corrugated flexible conduits.

Figure 19:
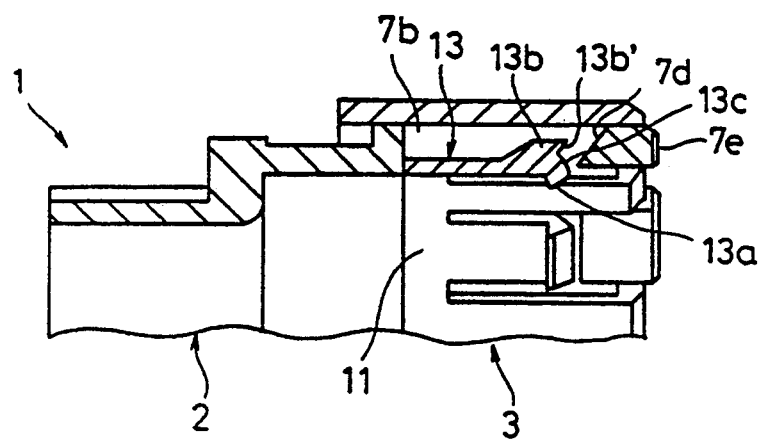
FIG. 19 is an enlarged fragmentary longitudinal sectional view showing a principal part of a jointing device for a corrugated flexible conduit, according to a third embodiment of the invention.
Figure 21:
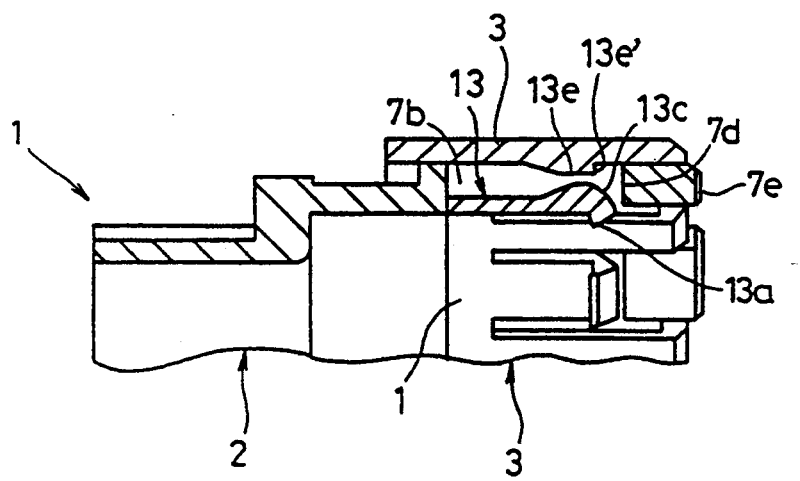
FIG. 21 is an enlarged fragmentary longitudinal sectional view showing a principal part of a jointing device for a corrugated flexible conduit, according to a fourth embodiment of the invention.

Further, in the third and fourth embodiments respectively shown in FIGS. 19 and 21, modifications of the stopper of the clasp 3 according to the second embodiment shown in FIG. 10 are explained. Such modifications are of course applicable to the stopper of the clasp 3 according to the first embodiment shown in FIG. 1.

What is claimed is:

1. A jointing device for a corrugated flexible conduit, the corrugated flexible conduit having ridges and grooves, the joint device comprising:
 a joint body having a cylindrical connector section for receiving the corrugated flexible conduit, said cylindrical connector section having a longitudinal axis and a plurality of circumferentially spaced apart receive holes arranged in a circumferential surface thereof, said receive holes each being defined by at least one receive-hole-defining face formed in said cylindrical connector section; and
 a clasp member axially slidably mounted on said joint body;
 said clasp including:
  an outer cylinder member axially slidably fitted over said cylindrical connector section and covering the plurality of receive holes of said cylindrical connector section;
  an inner cylinder member slidably fitted into said cylindrical connector section for receiving the corrugated flexible conduit therein;
  a plurality of locking members, said plurality of locking members having respective fixed ends which are connected with said inner cylinder member; and
  means for connecting said outer cylinder member and said inner cylinder member with each other;
 said locking members of said clasp each having a free end portion which comprises a claw portion which extends radially and which is engageable with the corrugated flexible conduit and which is disengageable from the corrugated flexible conduit;
 said free end portion of each locking member being receivable in a corresponding one of the plurality of covered receive holes of said cylindrical connector section when said free end portions are pushed radially outward by engagement with the corrugated flexible conduit which is received in said inner cylinder member; and said clasp being movable relative to said cylindrical connector section to cause each claw of each locking member to be engaged with a groove of the corrugated flexible conduit by moving each locking member relative to said receive-hole-defining face to cause the free end portion of each locking member to be pushed radially inwardly toward the corrugated flexible conduit and into a groove of the corrugated flexible conduit by engagement of the locking member with a corresponding one of receive-hole-defining faces of said cylindrical connector section.

2. The jointing device according to claim 1, wherein:
said clasp further comprises a stopper which is movable to contact with a surface of said cylindrical connector section as said clasp is axially moved relative to said cylindrical connector section, to thereby prohibit further axial movement of said clasp relative to said cylindrical connector section when said stopper contacts said surface of said cylindrical connector section.

3. The jointing device according to claim 1, wherein:
said connecting means of said clasp comprises an end wall to which respective ends of said outer and inner cylinder members are connected;
said end wall having openings extending therethrough;
said cylindrical connector section having axially directed projections formed integrally therewith and being circumferentially aligned with said plurality of receive holes; and
said projections being slidably fitted into said openings of said end wall.

4. The jointing device according to claim 1, wherein:
said connecting means of said clasp comprises an end wall to which respective ends of said outer and inner cylinder members are connected;
said inner cylinder member of said clasp being disposed at a location close to said end wall in the axial direction of said jointing device; and
each locking member axially extending from said inner cylinder member to a side remote from said end wall.

5. The jointing device according to claim 1, wherein:
said connecting means of said clasp further comprises an end wall to which respective ends of said outer and inner cylinder members are connected;
said inner cylinder member being disposed at a location remote from said end wall; and
each locking member axially extending from said inner cylinder member toward said end wall.

6. The jointing device according to claim 1, wherein:
said clasp further comprises a plurality of stoppers which are respectively formed in the free end portions of corresponding locking members, for stopping relative axial movement between said clasp and said cylindrical connector section when said stoppers contact a stopper surface of said cylindrical connector section.

7. The jointing device according to claim 6, wherein:
each locking member has a sloping surface, and each stopper is formed in a corresponding one of said locking members at a location adjacent to said sloping surface of the corresponding one locking member, said sloping surface of each locking member being arranged for contact with an associated receive-hole-defining face of an associated receive hole of said cylindrical connector section, each stopper having an end face thereof facing a corresponding one of said receive-hole-defining faces;
said end face being formed into a tapered surface, said tapered surface end face cooperating with an associated one of the sloping surfaces to define a V-groove, as viewed in an axial cross section direction of said jointing device; and
each of the receive-hole-defining faces respectively associated with the end faces of said respective stoppers being formed into a tapered surface complementary to the associated tapered surface end face.

8. The jointing device according to claim 1, wherein:
said clasp further comprises a plurality of stoppers which are respectively formed on an inner peripheral surface of said outer cylinder member, for stopping relative axial movement between said clasp and said cylindrical connector section when said stoppers contact a stopper surface of said cylindrical connector section.

9. The jointing device according to claim 1, wherein:
at least one of said cylindrical connector section and said clasp is provided with means for applying a resistance to movement of said clasp in a direction for releasing engagement between said jointing device and the corrugated flexible conduit.

10. The jointing device according to claim 1, wherein:
each claw is formed at a radially inner side of the free end portion of the associated locking member; and
said cylindrical connector section and the associated locking members are arranged such that a boundary between a claw-formed portion of the free end portion of each locking member and a portion of the free end portion adjacent to the claw-formed portion is always located more radially inward than a radially inner edge of the receive-hole defining face disposed for contact with the locking member.

11. The jointing device according to claim 1, wherein:
each locking member is provided with a sloping surface disposed for contact with an associated one of the receive-hole-defining faces of said cylindrical connector section; and
a sloping surface-formed portion of each locking member having an axial cross sectional shape which is formed such that when the sloping surface contacts the associated receive-hole-defining face, an angle formed between a line tangent to the sloping surface at the point of contact and an axis of said jointing device is not greater than 45 degrees regardless of where on the sloping surface the locking member contacts the receive-hole-defining face.

* * * * *